(12) United States Patent
Gagné

(10) Patent No.: US 11,001,451 B2
(45) Date of Patent: May 11, 2021

(54) FOOD CONVEYOR SYSTEM AND METHOD

(71) Applicant: GROUPE SINOX INC., Saint-Anselme (CA)

(72) Inventor: Rémi Gagné, Lévis (CA)

(73) Assignee: Groupe Sinox inc.

( * ) Notice: Subject to any disclaimer, the term of this patent is extended or adjusted under 35 U.S.C. 154(b) by 0 days.

(21) Appl. No.: 16/660,210

(22) Filed: Oct. 22, 2019

(65) Prior Publication Data
US 2020/0122933 A1    Apr. 23, 2020

Related U.S. Application Data

(60) Provisional application No. 62/748,786, filed on Oct. 22, 2018.

(51) Int. Cl.
| | |
|---|---|
| *B65G 15/30* | (2006.01) |
| *B65G 21/06* | (2006.01) |
| *B65G 43/00* | (2006.01) |

(52) U.S. Cl.
CPC ............. *B65G 43/00* (2013.01); *B65G 15/30* (2013.01)

(58) Field of Classification Search
None
See application file for complete search history.

(56) References Cited

U.S. PATENT DOCUMENTS

| | | | | |
|---|---|---|---|---|
| 3,631,968 | A * | 1/1972 | Ward ..................... | B65G 45/16 198/497 |
| 5,458,051 | A * | 10/1995 | Alden ................... | A47J 37/044 198/626.5 |
| 6,044,960 | A * | 4/2000 | Cloud .................... | B65G 17/00 198/493 |
| 6,082,421 | A * | 7/2000 | Nicol ....................... | B27F 1/16 144/245.1 |
| 6,082,451 | A * | 7/2000 | Giroux .................... | E21B 21/10 166/72 |
| 7,584,835 | B2 * | 9/2009 | Wimsatt .................... | B08B 1/02 198/494 |
| 9,126,767 | B2 * | 9/2015 | Carter .................... | B65G 43/00 |

\* cited by examiner

*Primary Examiner* — Kavel Singh
(74) *Attorney, Agent, or Firm* — Lavery, De Billy, LLP; Gwendoline Bruneau

(57) ABSTRACT

A conveyer assembly, and a method of maintenance thereof, the assembly comprising a conveyer belt supported in rotation by a frame, and guard rails on each longitudinal side of the belt, wherein lever arms connected to pivoting fingers resting between the upper run of the belt and the frame connect the guard rail to the frame; and wherein upon deployment of the lever arms, the fingers pivot into contact with the upper run of the belt, thereby pushing the upper run of the belt up away from the frame, while the guard rails are lifted up from the frame; and upon release of the lever arms, the fingers pivot back between the upper run of the belt and the frame, thereby releasing the upper run of the belt while the guard rails are lowered to the frame.

20 Claims, 22 Drawing Sheets

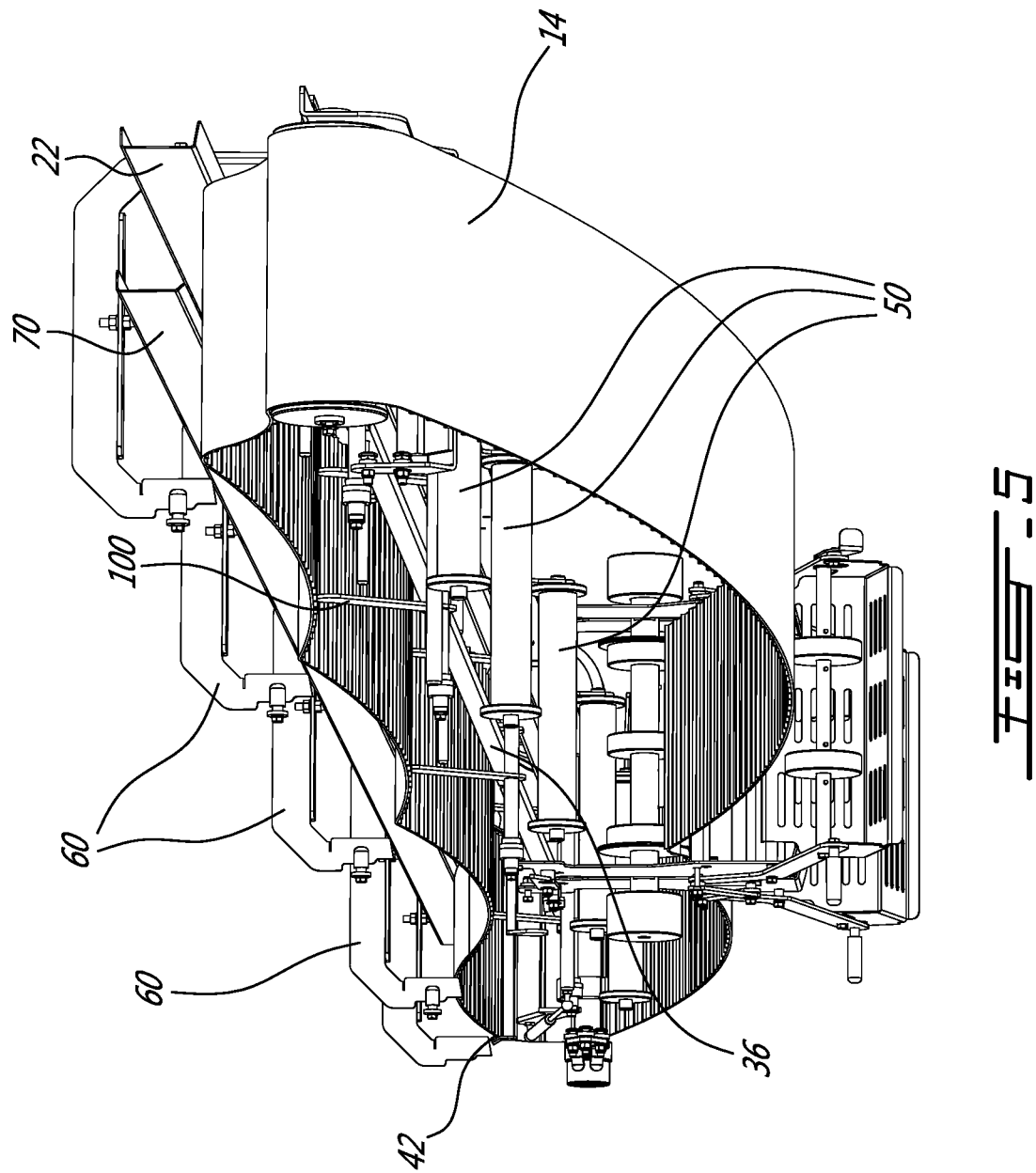

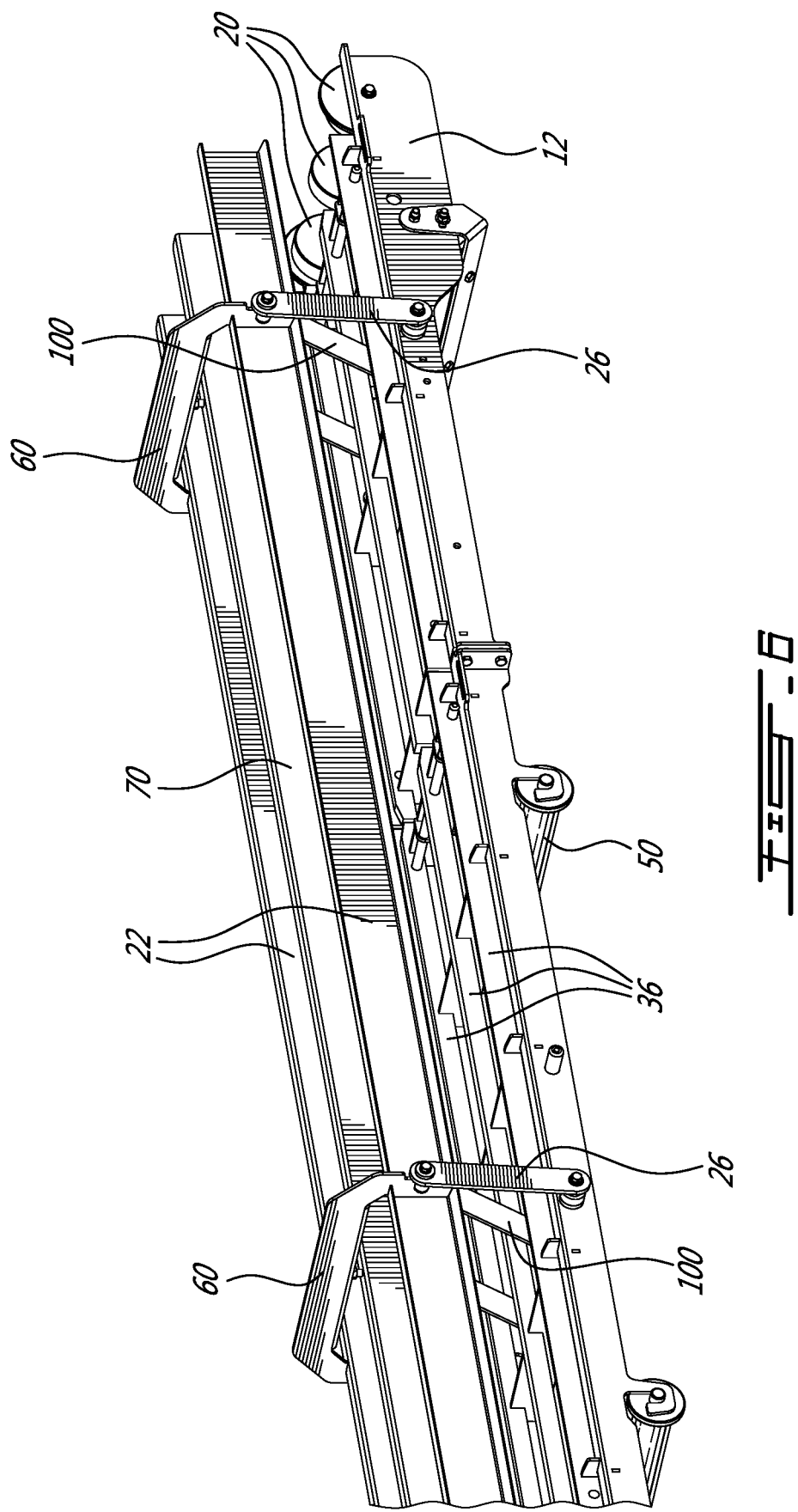

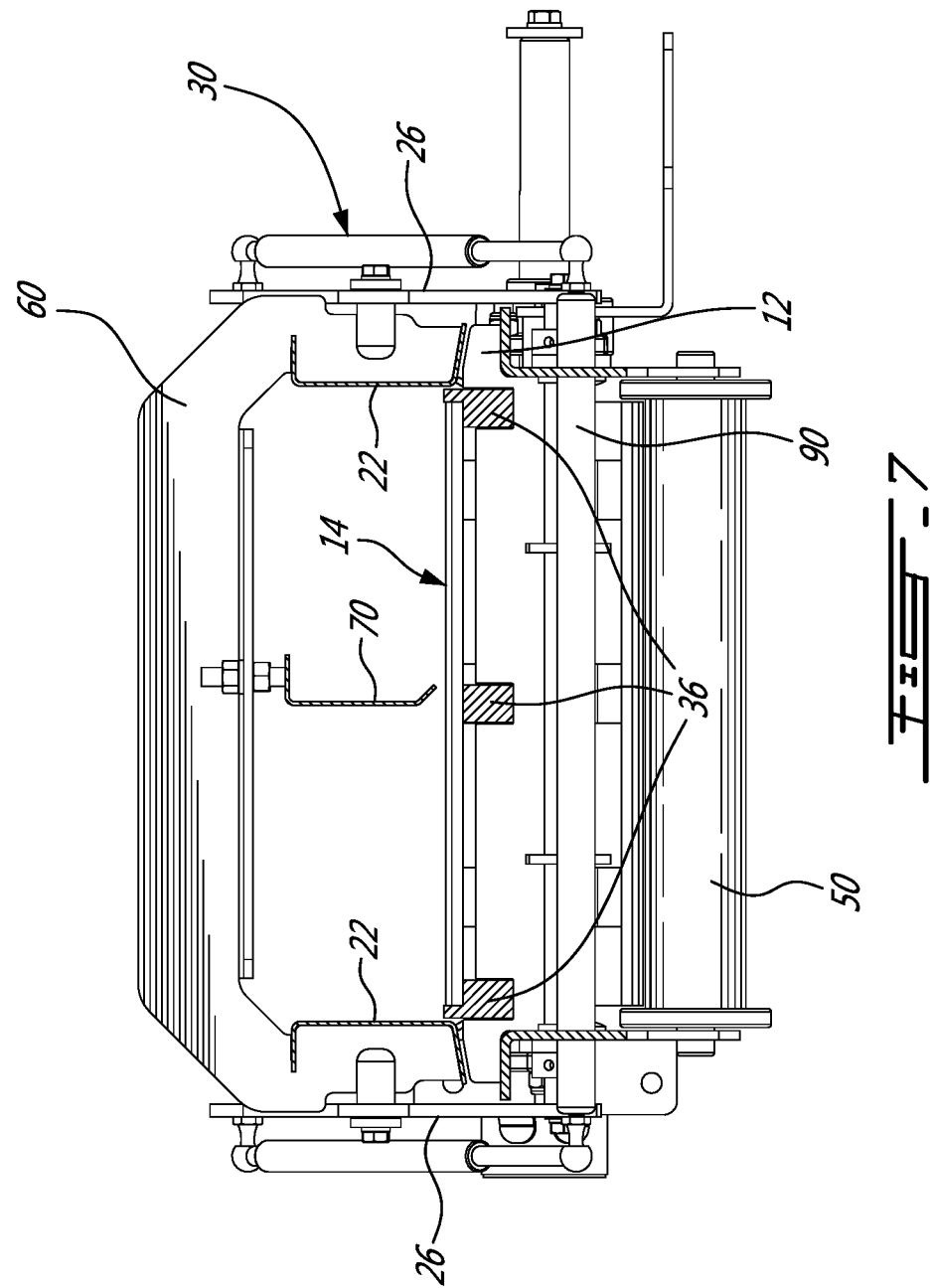

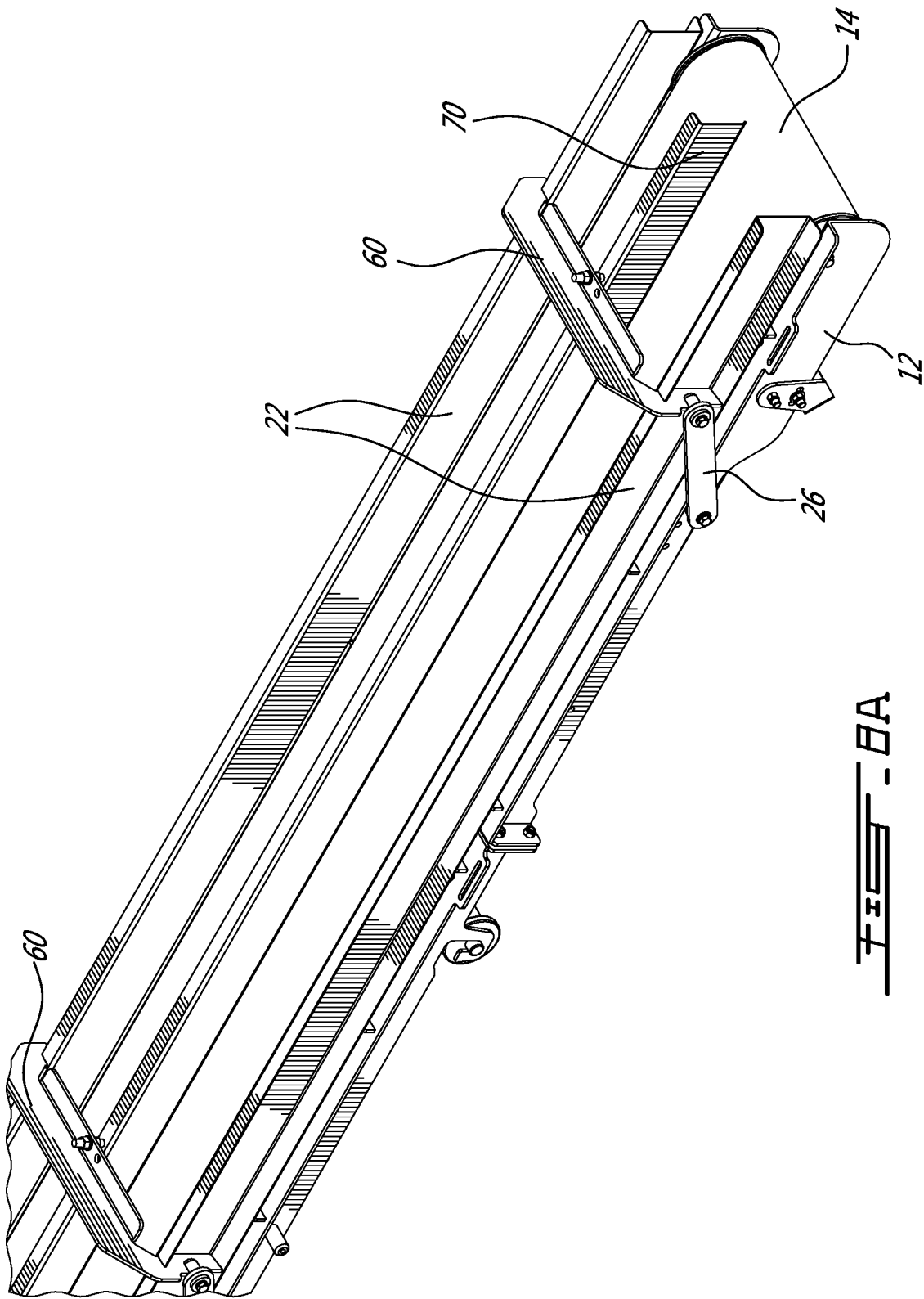

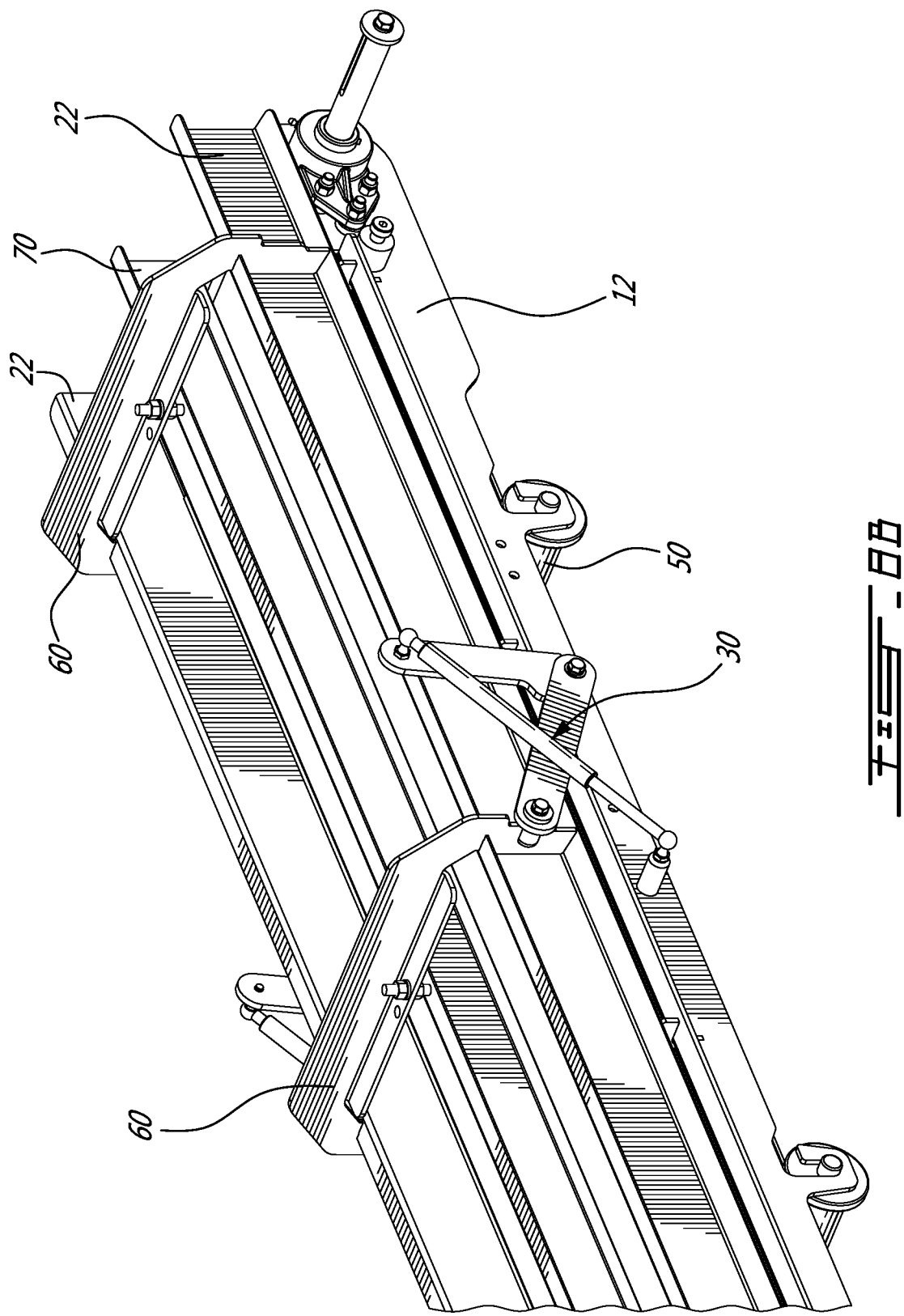

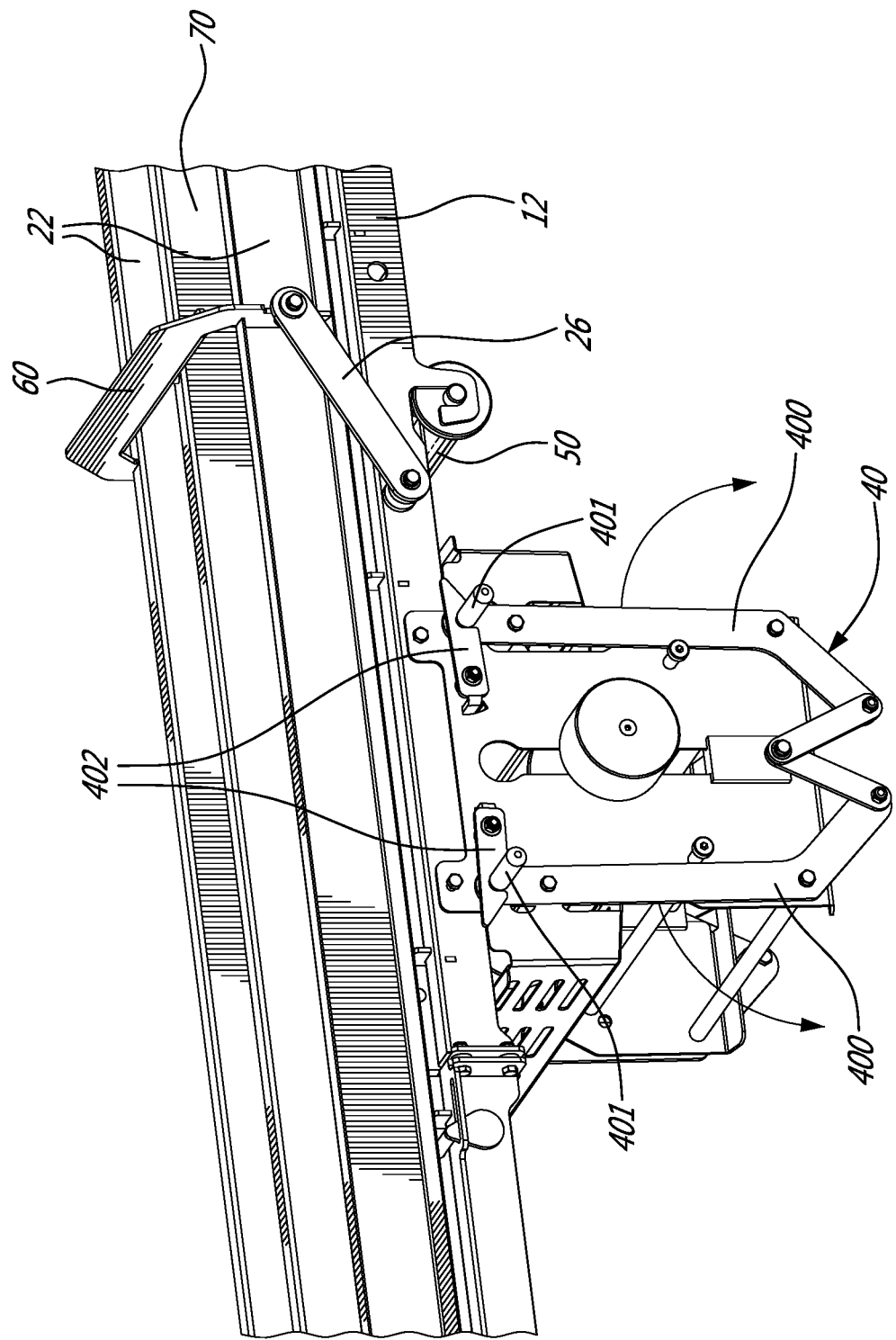

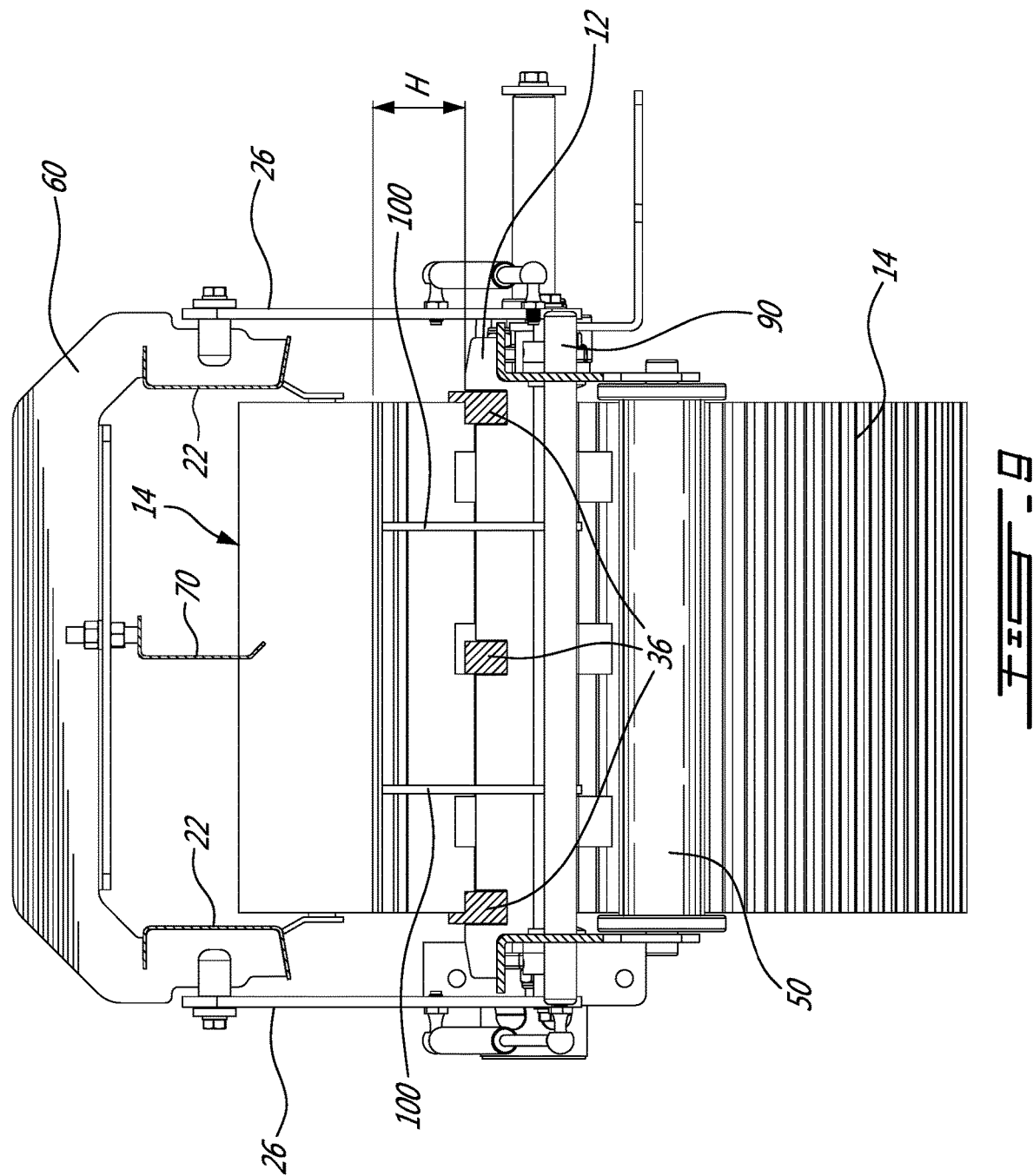

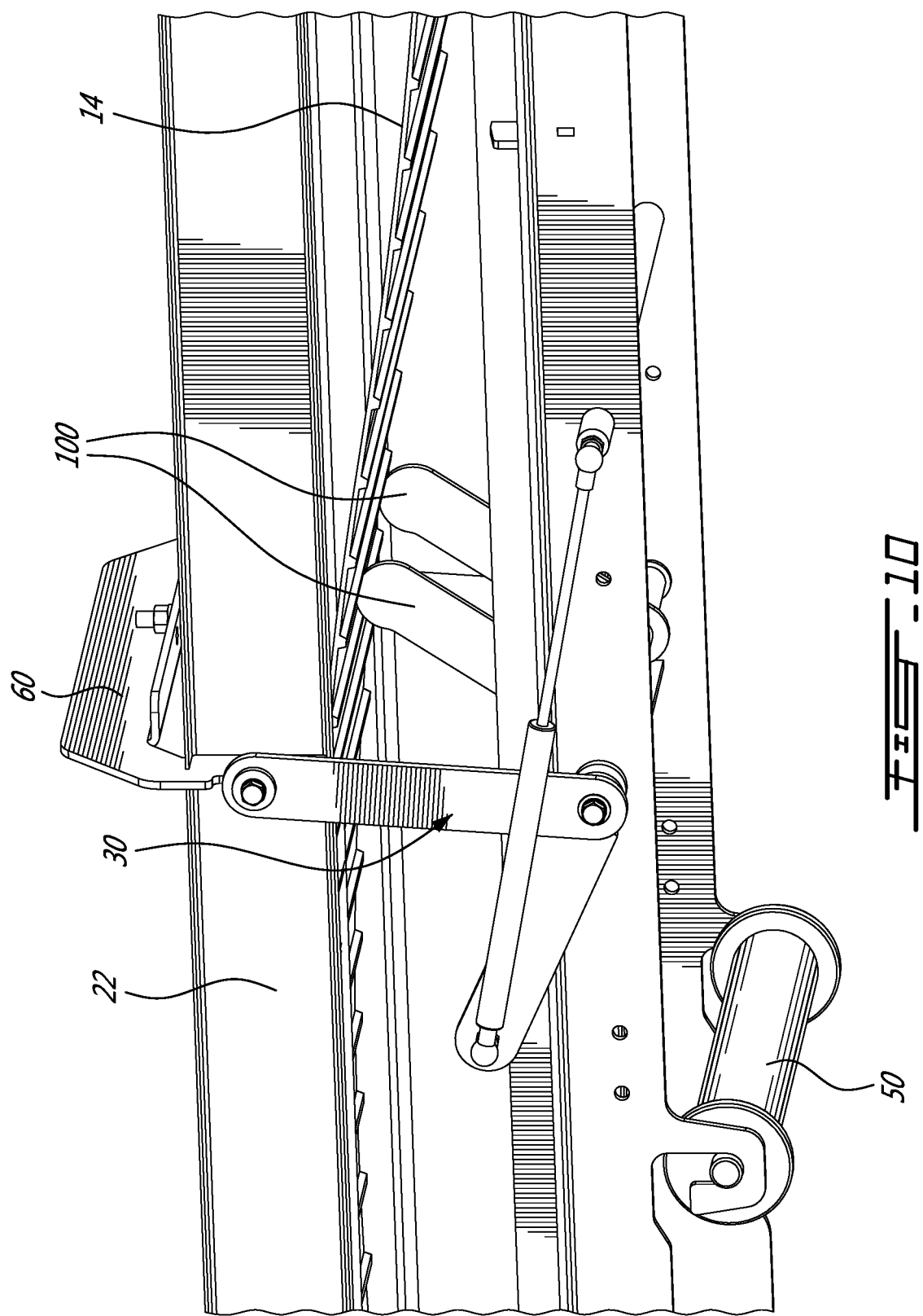

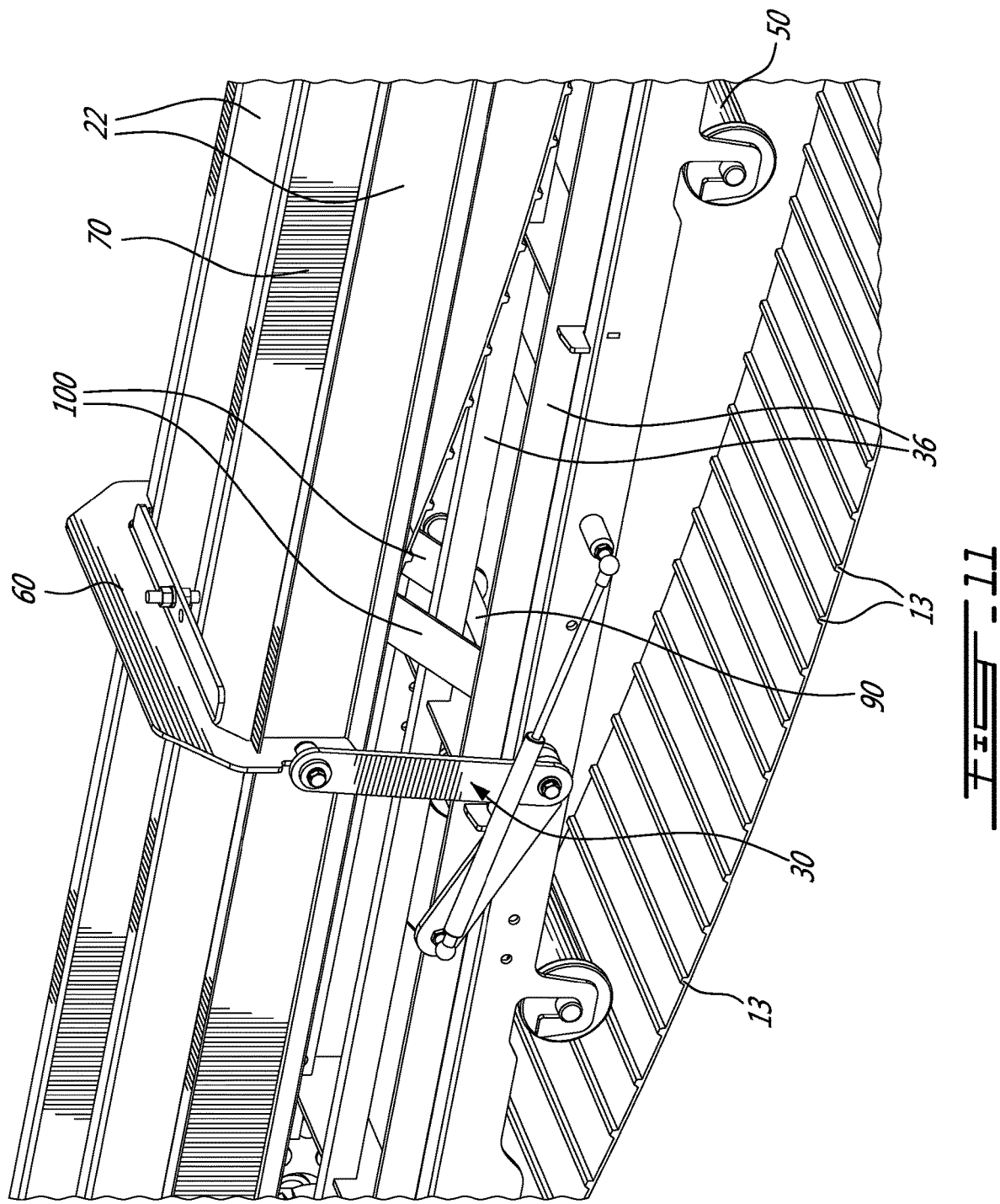

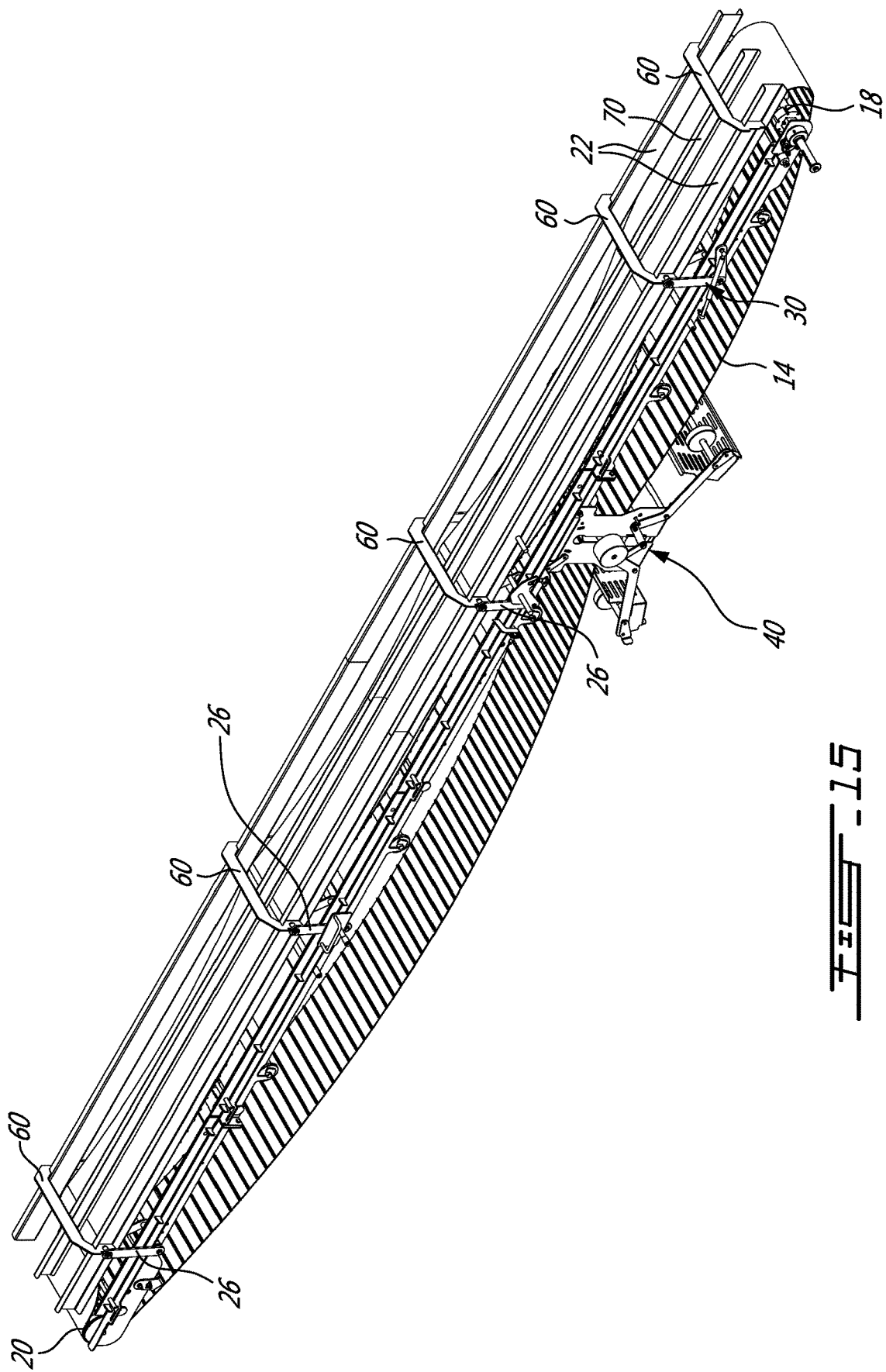

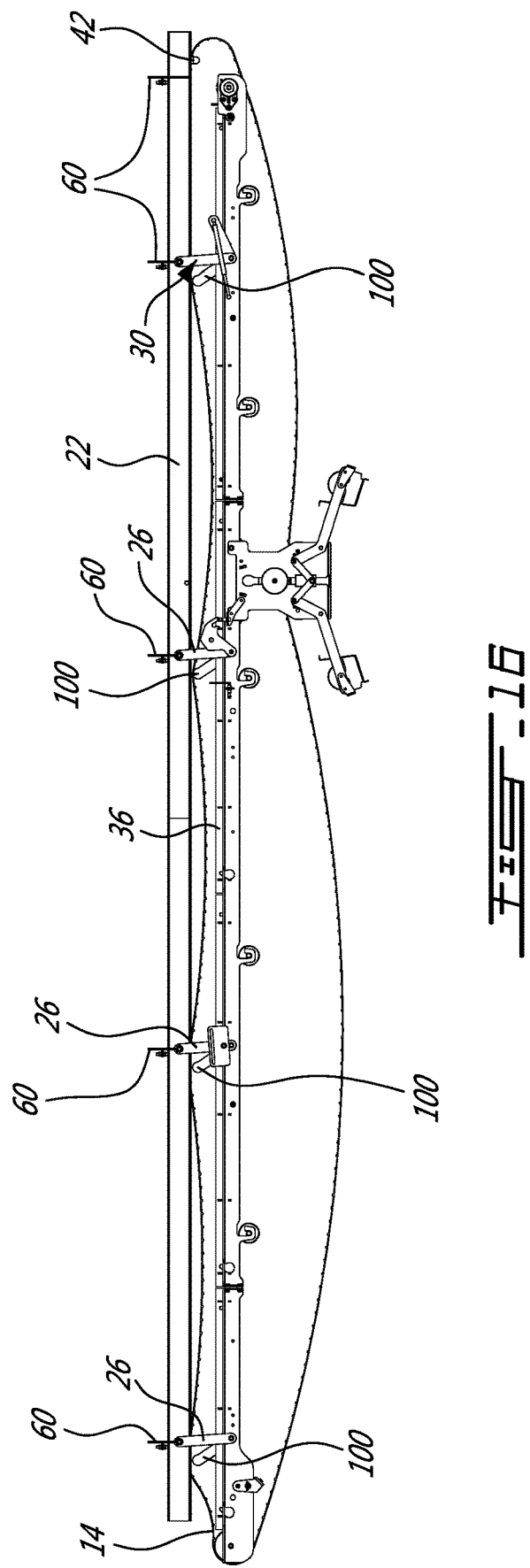

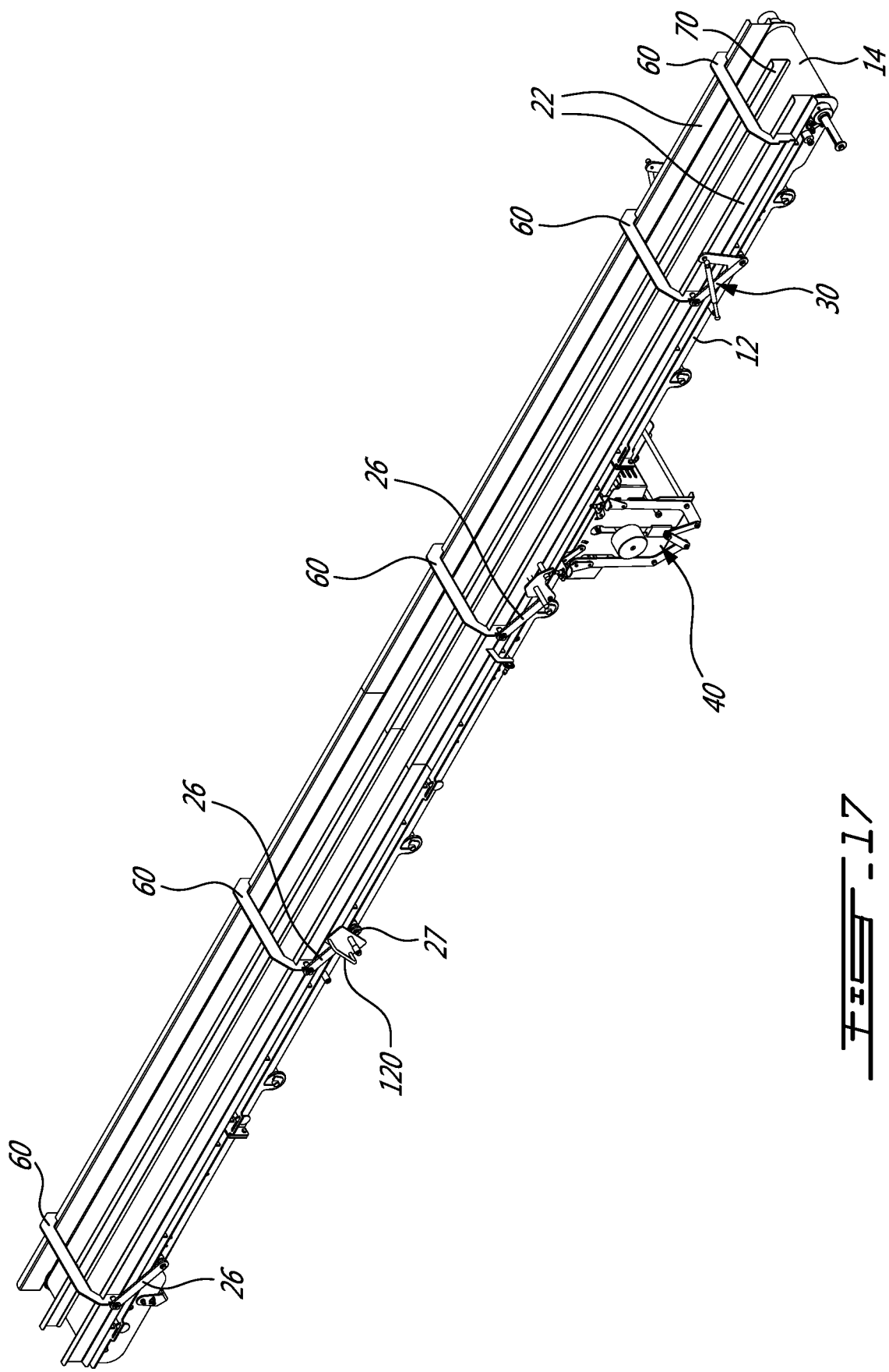

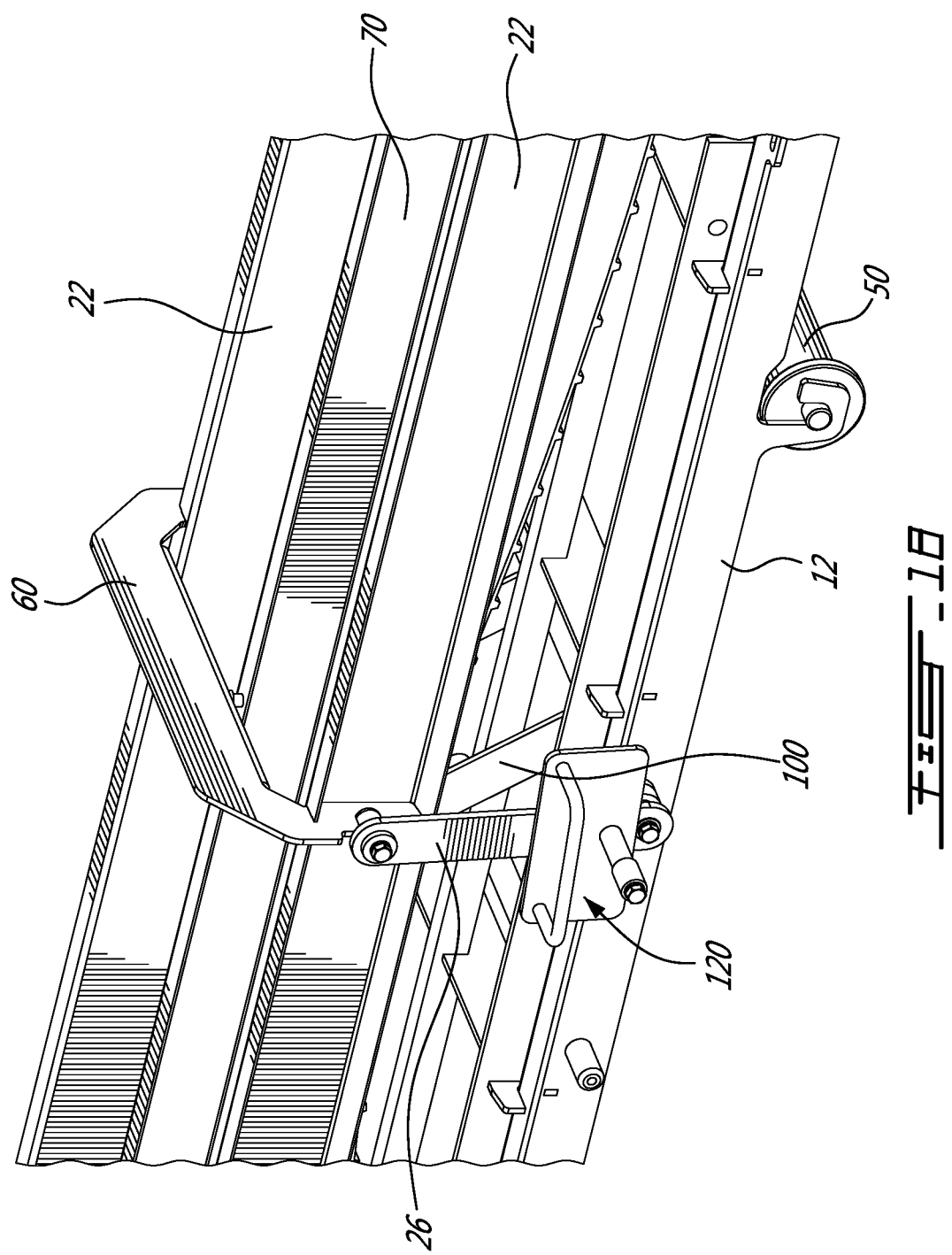

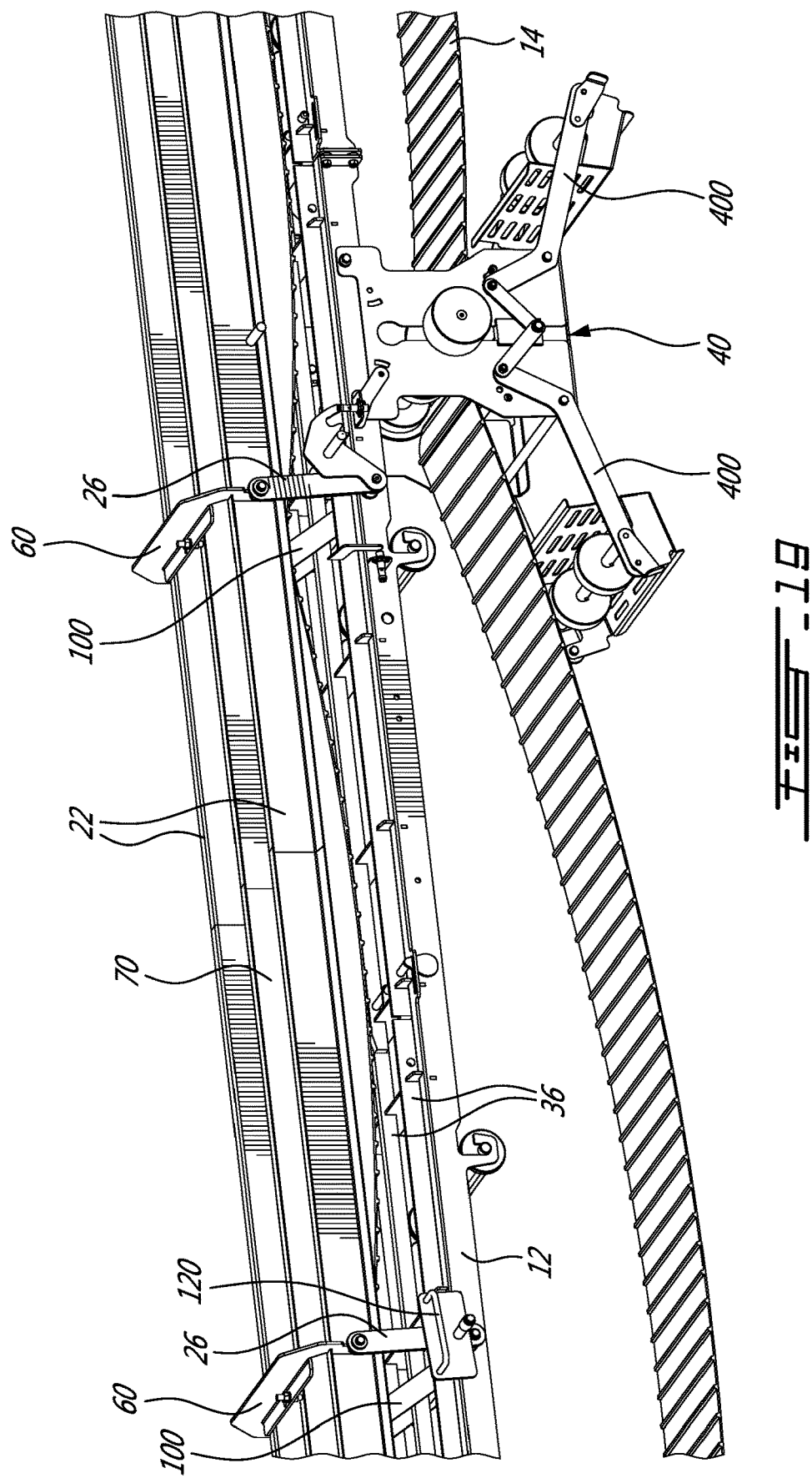

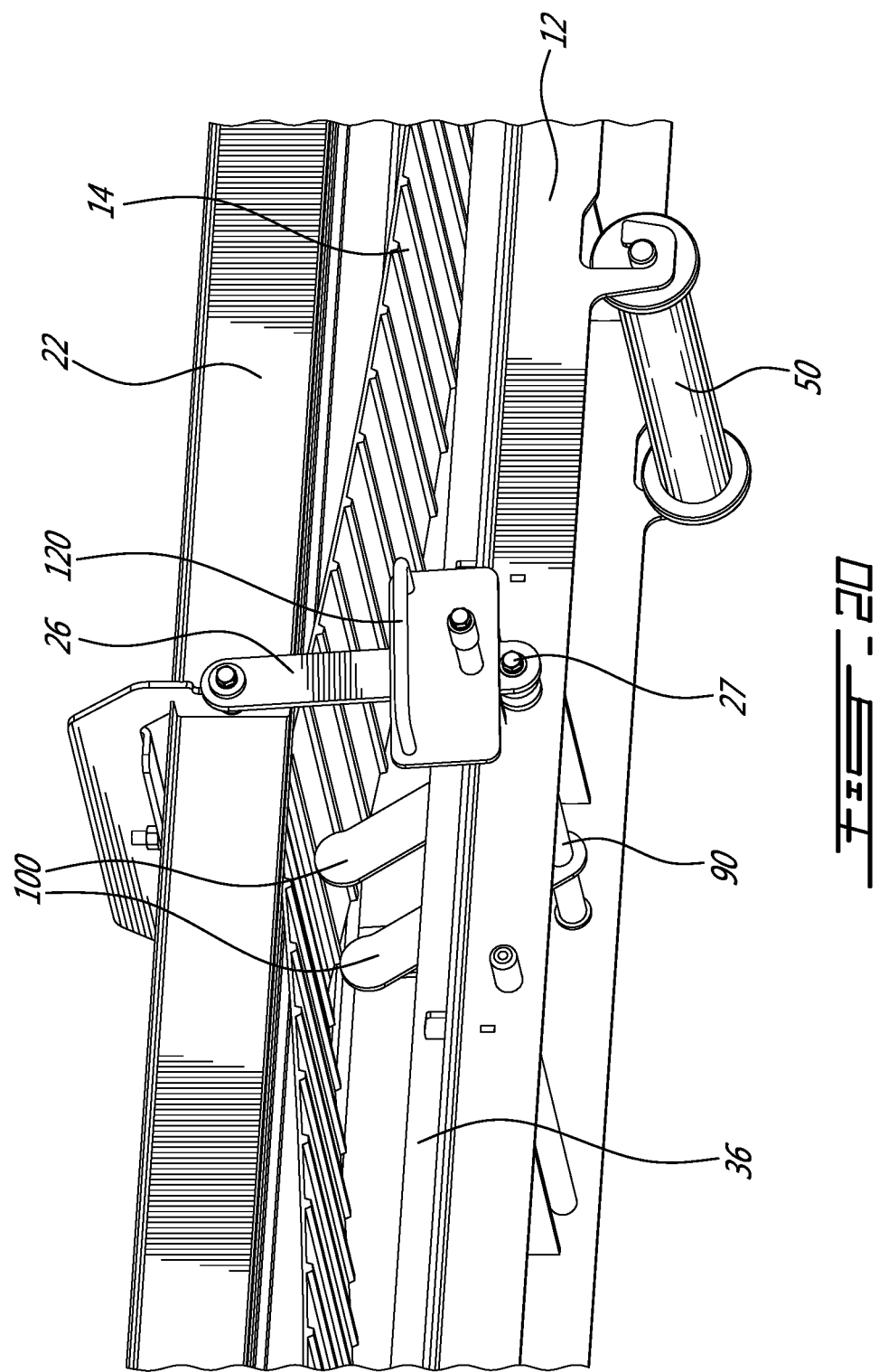

FOOD CONVEYOR SYSTEM AND METHOD

CROSS REFERENCE TO RELATED APPLICATIONS

This application claims benefit of U.S. provisional application Ser. No. 62/748,786, filed on Oct. 22, 2018. All documents above are incorporated herein in their entirety by reference.

FIELD OF THE INVENTION

The present invention relates to food processing equipment. More specifically, the present invention is concerned with a conveyor assembly and method.

BACKGROUND OF THE INVENTION

In the food processing industry, equipment in direct contact with the food needs to be easily and thoroughly cleaned. In meat processing plants for example, equipment is typically submitted to sanitation cycles, using pressurized water spraying lances and detergent chemicals.

Easy and practicable access to all contaminated parts of the equipment is a key issue, so as to prevent microorganisms, and/or meat residue and/or chemical cleaning/disinfection detergent particles from sticking to surfaces. Moreover cavities, recesses, blind spots are typically undesirable as they may become sites of bacteria growth in case of accumulation of residues or water.

There is still a need in the art for a conveyer assembly and method.

SUMMARY OF THE INVENTION

More specifically, in accordance with the present invention, there is provided a conveyer assembly, comprising a frame; a conveyer belt supported in rotation by the frame in an operating position of the conveyer assembly; and at least one pair of lever arms connected to the frame and to fingers supported by the frame below an upper run of the belt in the operating position of the conveyer assembly; wherein a deployment of the lever arms pivots the fingers to the upper run of the belt until the fingers push the belt up from the frame into a maintenance position of the conveyer assembly.

There is further provided a method for maintenance of a conveyer assembly comprising a conveyer belt supported in rotation by a frame in an operating position; and lever arms connected on each side of the frame and connected to pivoting fingers below an upper run of the belt, the fingers being pivoted away from an upper run of the belt in the operating position of the conveyer assembly, the method comprising deploying the lever arms, thereby pivoting the fingers up to the upper run of the belt such that the fingers come into contact with an undersurface of the upper run of the belt and lift the upper run of the belt up from the frame into a maintenance position of the conveyer assembly.

There is further provided a combination comprising a conveyer belt supported in rotation by a frame, and guard rails on each longitudinal side of the belt, wherein lever arms connected to pivoting fingers resting between the upper run of the belt and the frame connect the guard rail to the frame, and wherein, upon deployment of the lever arms, the fingers pivot into contact with the upper run of the belt, thereby pushing the upper run of the belt up away from the frame, while the guard rails are lifted up from the frame; and upon release of the lever arms, the fingers pivot back between the upper run of the belt and the frame, thereby releasing the upper run of the belt while the guard rails are lowered to the frame.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 5 shows details of the assembly in the maintenance position according to an embodiment of an aspect of the present disclosure;

FIG. 6 shows details of the assembly in the maintenance position according to an embodiment of an aspect of the present disclosure;

FIG. 7 is a section view of the assembly in the operating position according to an embodiment of an aspect of the present disclosure;

FIG. 8A is shows a return part of the assembly of FIG. 2;

FIG. 8B shows a drive part of the assembly of FIG. 2;

FIG. 8C shows a belt tensioner of an assembly according to an embodiment of an aspect of the present disclosure;

FIG. 9 is a section view of the assembly in the maintenance position according to an embodiment of an aspect of the present disclosure;

FIG. 10 shows a pivot arm of the assembly in the maintenance position according to an embodiment of an aspect of the present disclosure;

FIG. 11 shows a pivot arm of the assembly in the maintenance position according to an embodiment of an aspect of the present disclosure;

FIG. 15 is a top perspective view of the assembly in the maintenance position according to an embodiment of an aspect of the present disclosure;

FIG. 16 is a side view of the assembly in the maintenance position according to an embodiment of an aspect of the present disclosure;

FIG. 17 shows a top perspective view of the assembly in the operating position according to an embodiment of an aspect of the present disclosure;

FIG. 18 shows a detail of the assembly of FIG. 2;

FIG. 19 shows a detail of the assembly of FIG. 3; and

FIG. 20 shows a detail of the assembly of FIG. 3.

DESCRIPTION OF ILLUSTRATIVE EMBODIMENTS

Figure 1:
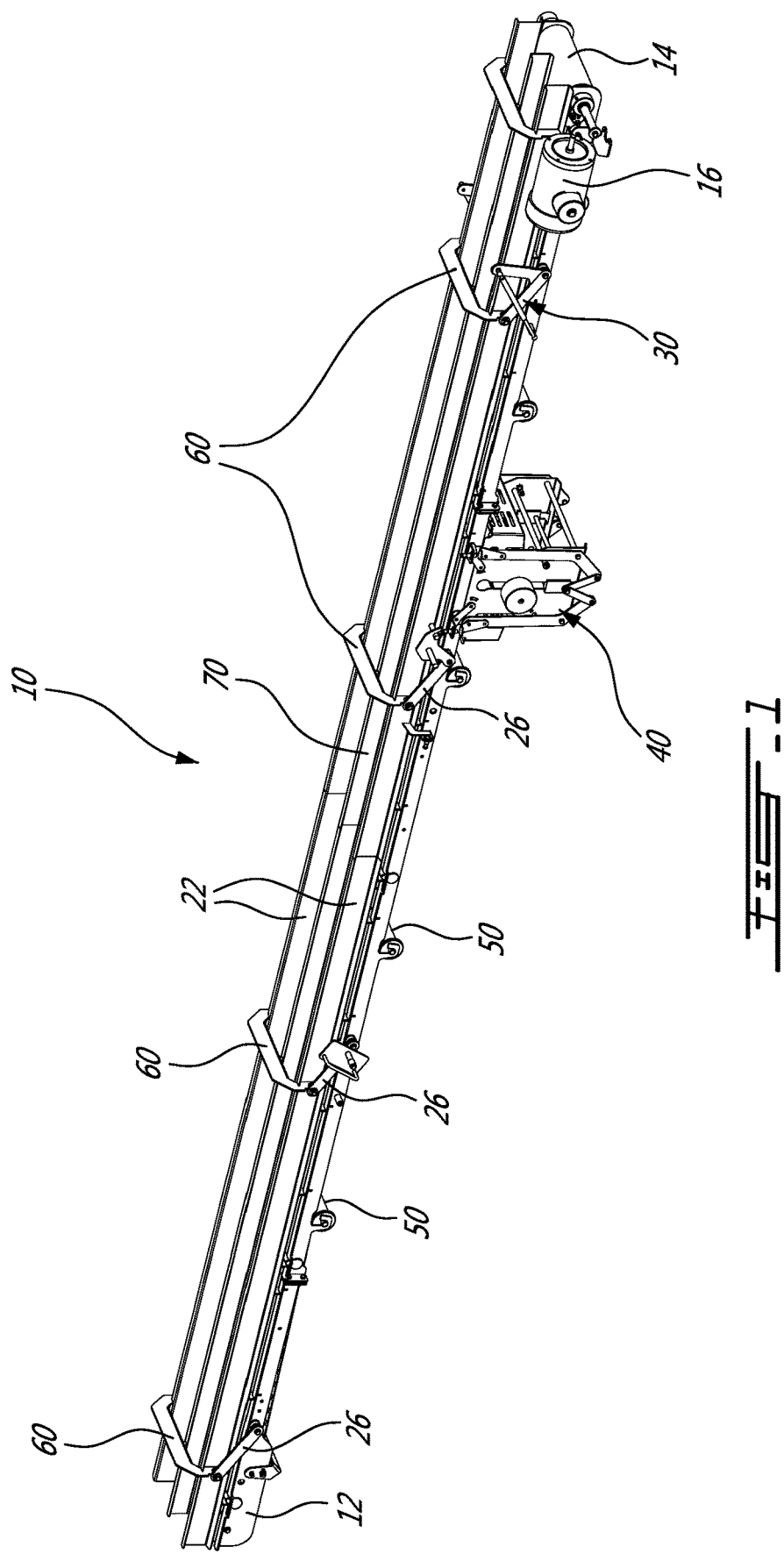
FIG. 1 is a side perspective view of an assembly in an operating position according to an embodiment of an aspect of the present disclosure.

The present invention is illustrated in further details by the following non-limiting examples.

A conveyer assembly 10 according to an embodiment of an aspect of the present disclosure illustrated for example in FIGS. 1-6 comprises a frame 12 and an endless belt 14 driven by a motorization unit 16 about a driving roller sprocket 18 (motorization end) and an idle roller sprocket 20, about the frame 12.

Figure 2:
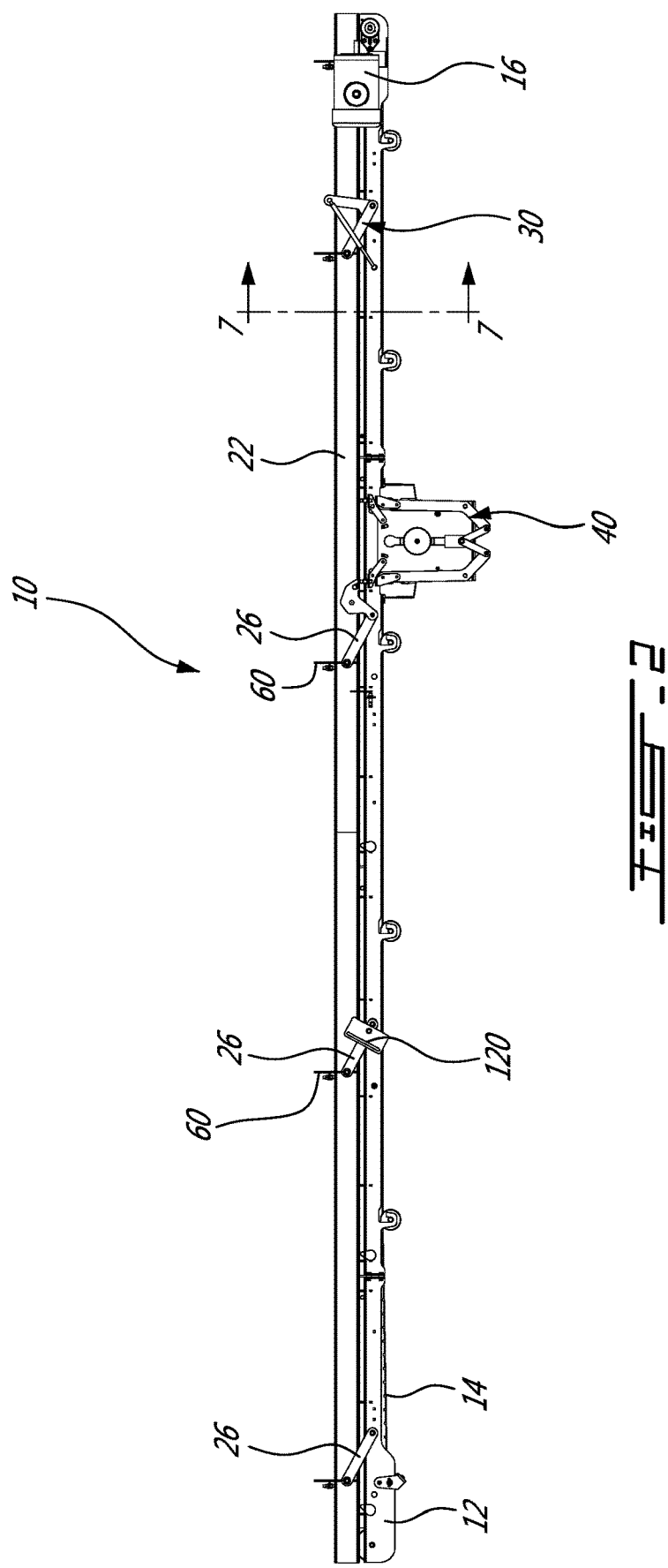
FIG. 2 is a side view of the assembly of FIG. 1.

In an operating position shown in FIGS. 1, 2 and 7, opposite guard rails 22 runs longitudinally along the upper run of the belt 14 on each side of the frame 12. Upper bridges 60 connect the guard rails 22 on opposite sides of the frame 12 together transversally above the belt 14. The upper bridges 60 may further support one or several separators 70 running longitudinally in between the two opposite guard rails 22, and defining different zones on the belt 14, for conveying products separately on the belt for example.

The belt 14 is supported by longitudinal slider supports 36 above the frame 12 on the upper run thereof. Rollers 50 may be provided on its return run so as to control hanging down of the belt underneath the frame 12 when in the maintenance position of the assembly. Note that in FIGS. 3, 5, 9, 11-13, 15, 16 and 19, the return way of the belt is shown sagging between the motorized end and the idle end, for clarity. FIG. 4 shows the return run of the belt as supported with controlled sags underside of the frame by the rollers 50. The number of slider supports 36 and/or rollers 50 is adjustable depending on the width and/or length of the assembly and/or according to the type of belt. For example, in case of a belt 14 made in a soft material such as urethane for example, extra rollers 50, may be provided to support the return run of the belt underneath the frame.

A belt tensioner 40, shown mounted underneath the frame for example, comprises tensioning arms 400 that may be moved from a release position, at a distance from the frame, to a tension position shown in FIGS. 1, 2 and 8C for example, in which they reach the undersurface of the return run of the belt and lift the belt 14 against the frame 12. From this active position, the tensioning arms 400 may be returned to the release position, thereby releasing the tension on the belt 14. In an embodiment illustrated herein, the tensioning arms 400 are twin arms that may be manually operated, using handles 401 to rotate them, on opposite directions, up and down. They may be locked in the active position, by a bracket 402 mounted to the frame 12 and engaging the handles 401 (see FIG. 8C) for example. The belt tensioner 40 shown comprises two such set of twin arms, connected together as a unit across the width of the frame under return run of the belt.

Figure 3:
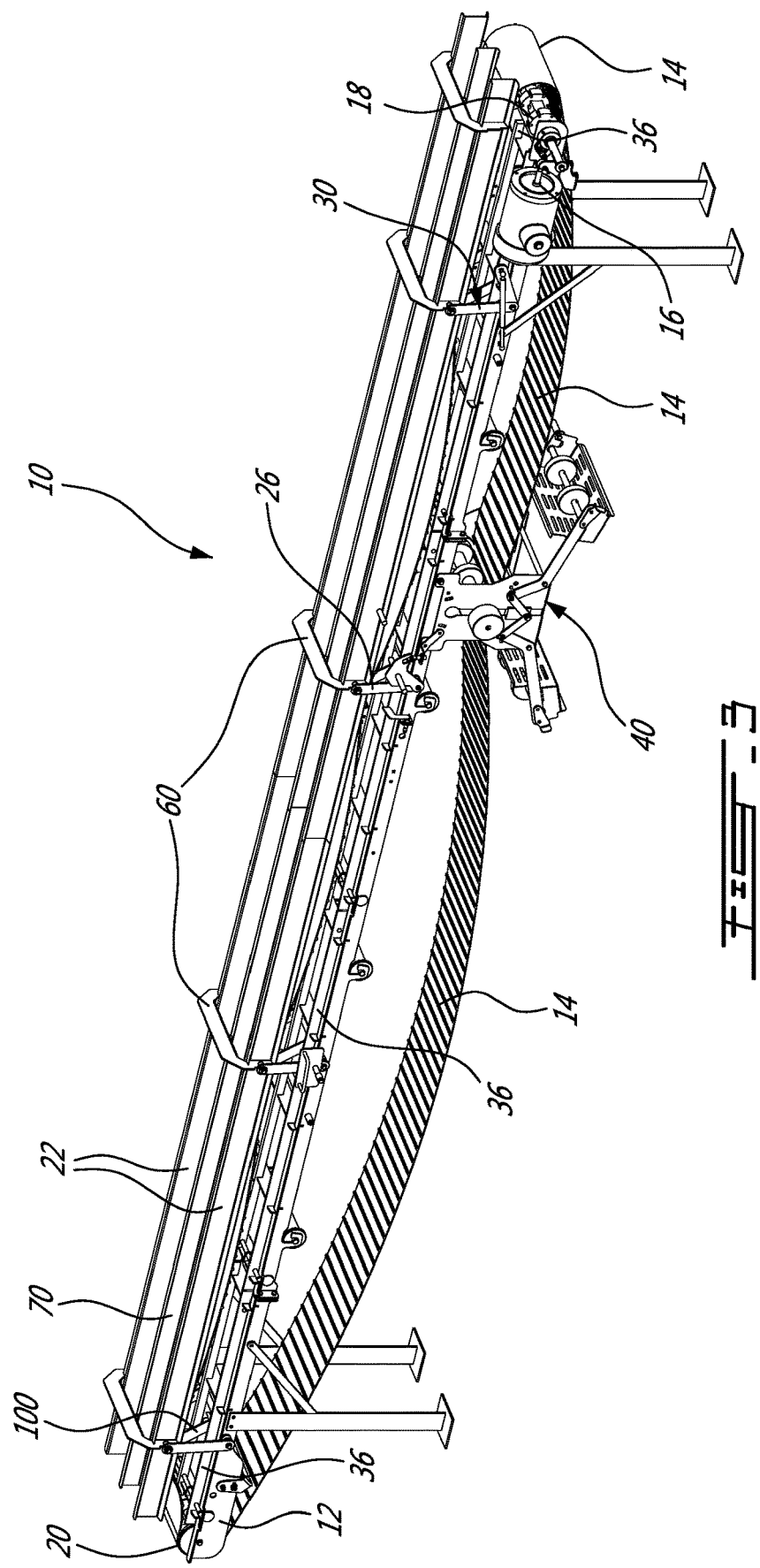
FIG. 3 is a side perspective view of the assembly in an maintenance position according to an embodiment of an aspect of the present disclosure.
Figure 4:
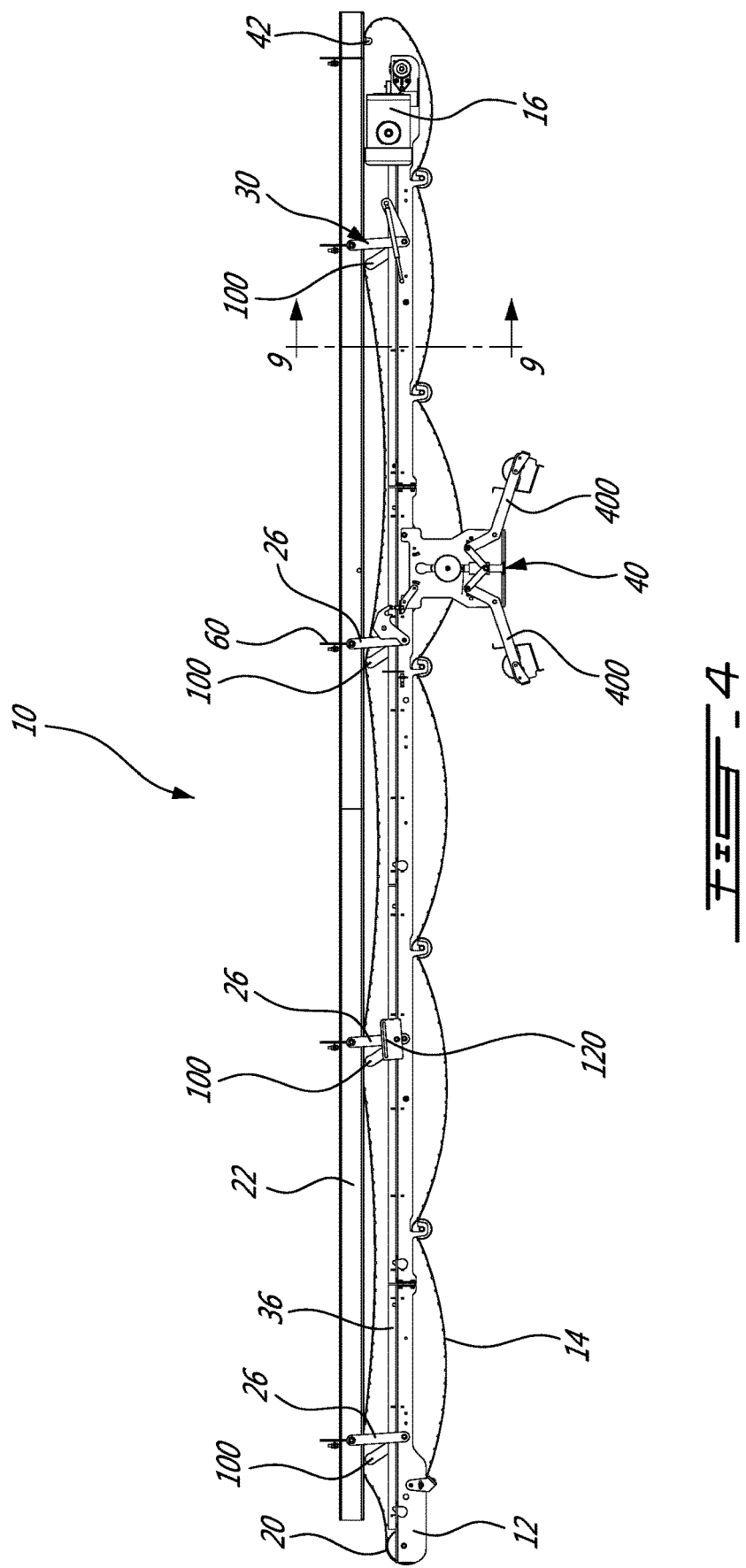
FIG. 4 is a side view of the assembly of FIG. 3.

The guard rails 22 are connected to the frame 12 by lifting members such as lever arms 26 for example, so that the guard rails 22 may be lifted up from the frame 12, from the operating position shown in FIGS. 1, 2 and 7 to an maintenance position shown in FIGS. 3, 4 and 9 for example, by extension of the lever arms 26. The guard rails 22 may be repositioned down again relative to the frame 12 by retraction or folding or collapsing of the lifting members 26, 30, to the operating position of the assembly. Gas spring arms 30 may be used for assistance in case of a manual deployment of the lever arms 20 by a pulling action up the guard rails 22 and manual release of the lever arms 20 by a pushing down action the guard rails 22, relative to the frame 12.

Figure 12:
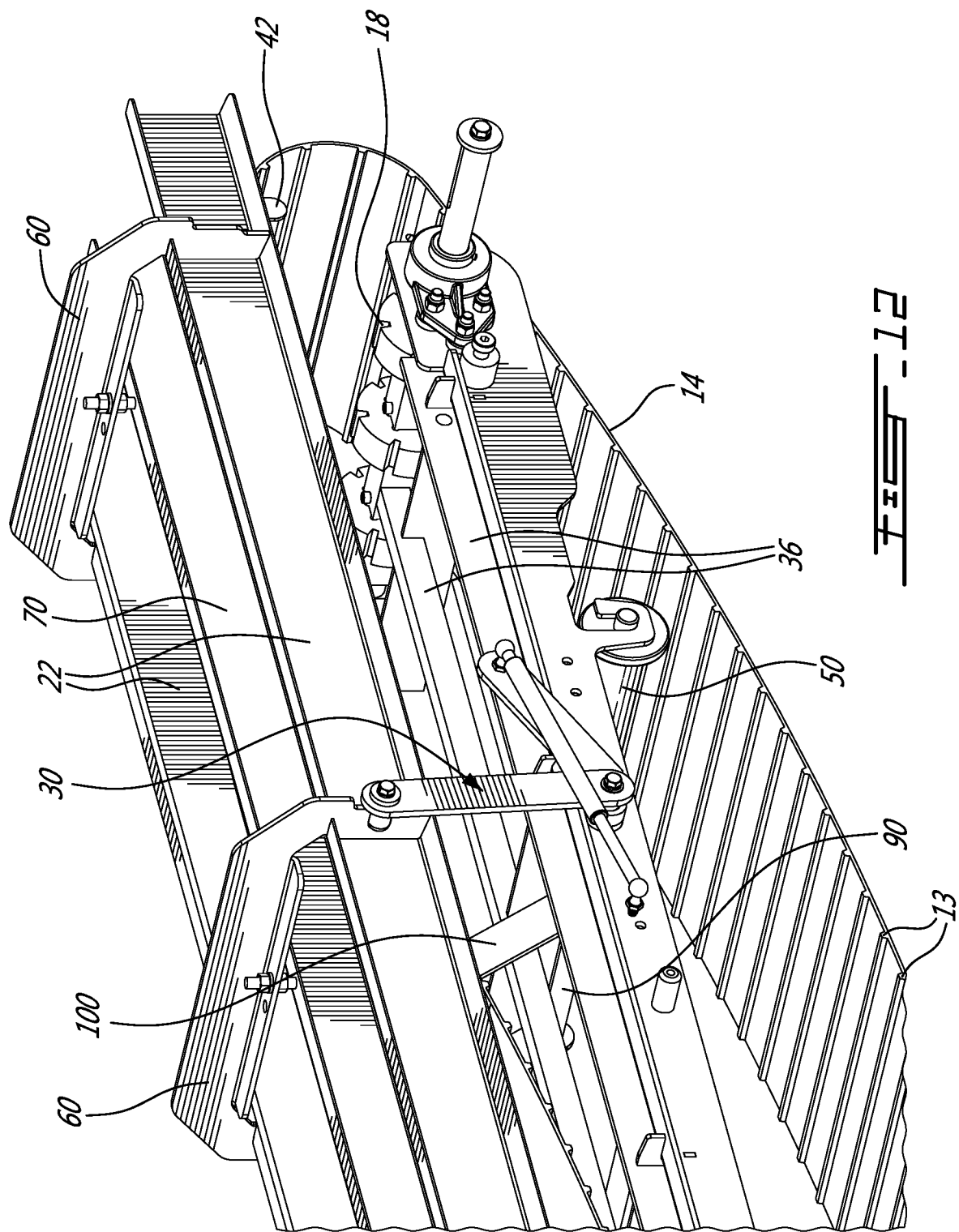
FIG. 12 shows a driving part of the assembly in the maintenance position according to an embodiment of an aspect of the present disclosure.

FIGS. 11 and 12 show that opposite lever arms 26 are connected together as a unit across the width of the frame 12 by a shaft 90, for simultaneous movement of the opposite lever arms 26. The shaft 90 supports fingers 100 on its lower circumference, away from the undersurface of the upper run of the belt, in the operating position of the assembly. Upon pivoting of the shafts 90 during extension of the lifting members 26 from the operating position to the maintenance position, the fingers 100 are moved into contact with the undersurface of the upper run of the belt as the pairs of lever arms 26 deploy. The fingers 100 thus emerging below the upper run of the belt 14 in the operating position are raised into contact with the underside of the upper run of the belt 14 and push the upper run of the belt up, from below, as the guard rails 22, and separators 70 and bridges 60 if any, are lifted up to the maintenance position of the assembly. As best seen in FIG. 4, on the motorization end, a hook 42 mounted on the guard rails 22 may grip the belt 14 from above.

The hook 42 is used to disengage any traction between the belt and motorization end roller 18 during opening of the assembly. For example, in case of a belt comprising traction T-bars 13, the traction T-bars 13 may be disengaged from the motorization end roller 18 by the hook 42, before opening of the assembly.

Thus, in the maintenance position illustrated in FIGS. 3-5 and 9 for example, the belt 14 is lifted away from above the frame 12 by the fingers 100, and the guard rails 22 lifted away from above the frame 12 by the deployed lever arms. As seen in FIG. 9, the upper run of the belt 14 is thus raised from its position relative to the frame 12 in the operating position of FIG. 7 by a height (H).

A gravity tensioner single motion opening unit as illustrated may be selected for example; alternatively, a sliding tensioner positioned at return rollers 20 may be used for example.

Thus, in the maintenance position, the upper run of the belt 14 is lifted up from above the frame 12 from below while the return run of the belt is detached from the underneath of the frame, and guard rails, as well as separators and bridges mounted thereto if any, are raised up above the frame 12. Thus, access to parts of the assembly in between the guard rails and the frame, and between the upper and return runs of the belt for instance, and generally parts that are otherwise non accessible in the operating position and during operation of the assembly, including slider supports 36 or traction T-bars 13 of the belt 14, rollers 18, 20, 50 and surfaces of the frame 12, as best seen in FIGS. 3, 4, 5, 6, 9, 10, 11, 12, 13, 14, 15, 16, 19 and 20 for example.

Figure 13:
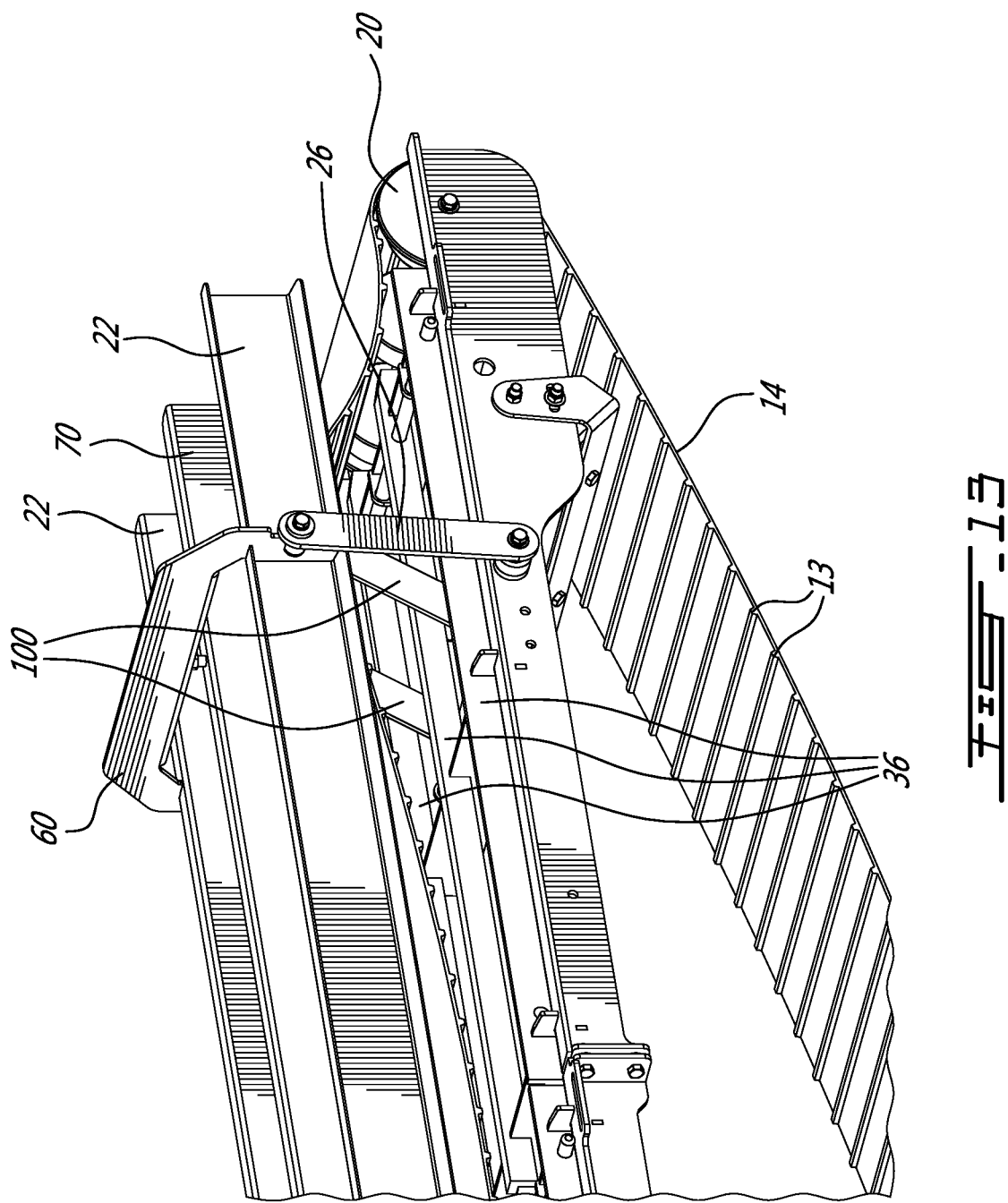
FIG. 13 shows a return part of the assembly in the maintenance position according to an embodiment of an aspect of the present disclosure.
Figure 14:
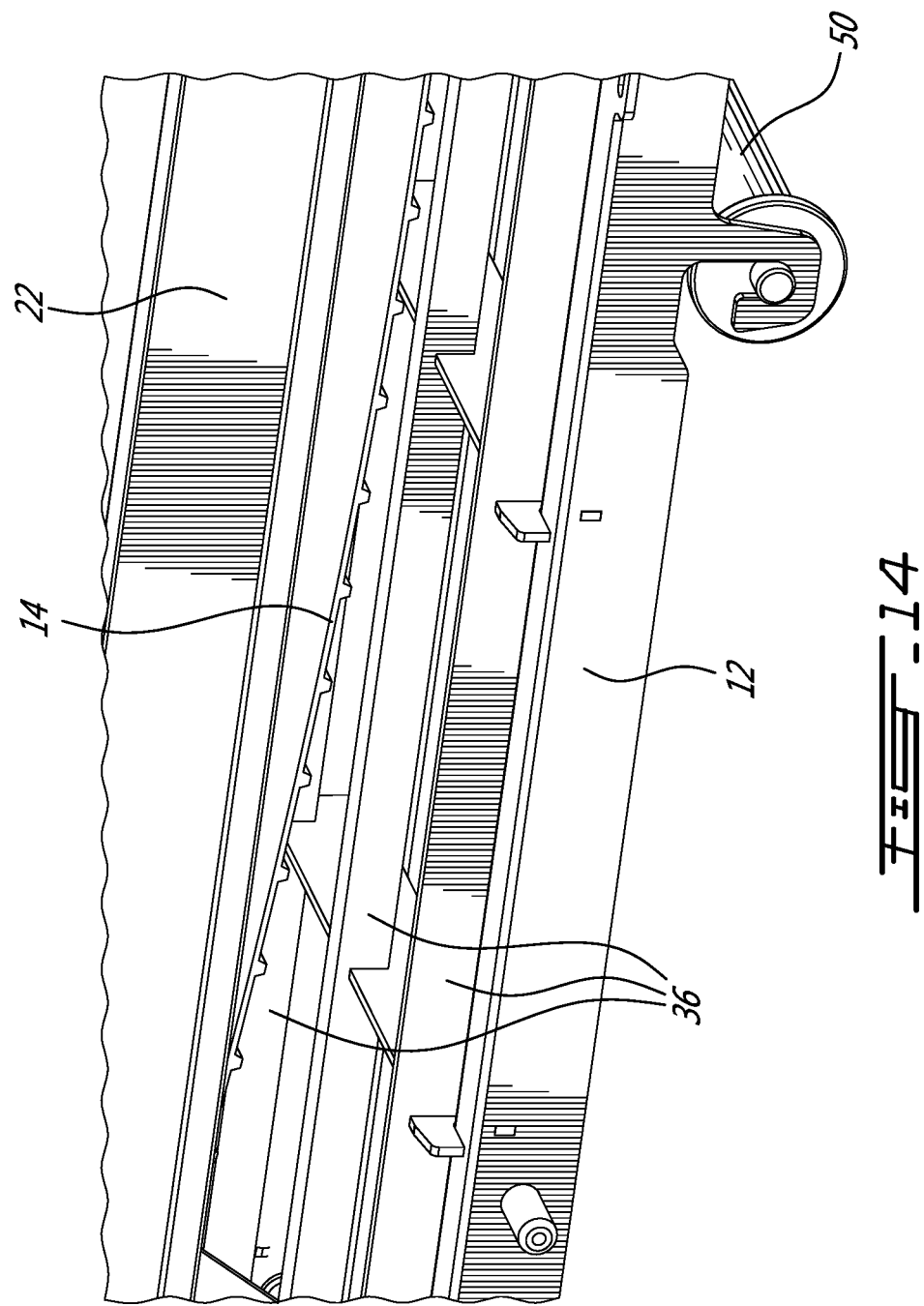
FIG. 14 shows slider supports of the assembly in the maintenance position according to an embodiment of an aspect of the present disclosure.

FIG. 12 shows access to the motorization end of the frame while FIG. 13 shows access to the return end of the frame and FIG. 14 shows access to the slider supports for example.

As the assembly closes down by collapsing of the lifting members 26, the fingers 100 are returned to a retracted, generally horizontal, position between the upper and the return runs of the belt 14 in between the slider supports, without contact with the belt 14.

As illustrated in FIGS. 1, 2, 7, 8, 17 and 18 for example, in the operating position, i. e. the of the conveyer assembly 10, when conveying products on an upper surface of the upper run of the endless belt 14, such inner parts of the conveyer assembly 10, including nips or zones that may present danger to operators when the conveyer assembly is operating, are covered or otherwise shielded out of reach, hence the reference to a "closed" position for operation as opposed to the "open" position for maintenance.

The lever arms 26 and fingers 100 moving as a unit, such as by being welded or bolted to the shaft 90 for example, allows raising of the guard rails and clearing the belt away from the frame in a single motion operation.

FIGS. 17-20 show locks 120 used to lock the lever arms 26 in their deployed position as they support the guard rails 22 away from the frame 12. The locks 120 engage the pivot 27 of the lever arms, thereby locking the movement of the lever arms for example, thereby securing the conveyer assembly in the maintenance position.

In a method according to an embodiment of an aspect of the present disclosure, the assembly 10 may thus be opened from the closed, operating position, in a single motion operation, by unlocking the belt tensioner so as to release tension on the belt and lifting the guard rails for example by pulling on upper bridges connecting the guard rails above the belt if any, thereby engaging upraising of the lever arms until the guard rails 22 and the belt are cleared away, in a mainly vertical direction, from the frame into a position allowing direct access to inner parts and parts that engage together during operation, for maintenance purposes, such as cleaning or repairing for example. The lever arms may be locked into in their deployed position as they support the guard rails 22 away from the frame 12.

Since the opening movement of the assembly occurs in an essentially vertical direction on top of the conveyor frame, and below the conveyor frame, the space on the facility floor surrounding the conveyor assembly is mainly unaffected by the opening (and closing) of the conveyer assembly.

Opening of the conveyer assembly from the operating position thereof may be operated by lever arms as illustrated, or by other lifting members such as manual gearboxes, a motor-reduction unit, pneumatic or hydraulic actuators for example, depending on the length and width of the belt.

Once the assembly is ready for operation after cleaning or maintenance in the maintenance position thereof, the guard rails and belt may be repositioned, relative to the frame, to the operating position, by operating the belt tensioner to gather the belt length under the frame against the frame, unlocking the lever arms, and pressing down on the guard rails so as to engage withdrawal of the lever arms and release of the belt and guard rails down on the frame.

There is thus provided a conveyer assembly, easy to clean and sanitize efficiently and rapidly, thus reducing downtime, for an effective cleaning meeting strict sanitation standards.

The present assembly may be used in a range of environments such as food, medical, and pharmaceutical industries for example.

The scope of the claims should not be limited by the embodiments set forth in the examples but should be given the broadest interpretation consistent with the description.

The invention claimed is:

1. A conveyer assembly, comprising:
   a frame;
   a conveyer belt supported in rotation by said frame in an operating position of the conveyer assembly;
   at least one pair of lever arms connected to the frame and to fingers supported by the frame below an upper run of the belt in the operating position of the conveyer assembly; and
   guard rails connected to the frame by lifting members on each side of the frame, and running longitudinally along the upper run of the belt on each side of the frame in the operating position of the conveyer assembly;
   wherein a deployment of the lever arms pivots said fingers to the upper run of the belt, until said fingers push the belt up from the frame, and lifts the guard rails from the frame, into a maintenance position of the conveyer assembly.

2. The conveyer assembly of claim 1, further comprising bridges connecting the guard rails together transversally above the belt, wherein the deployment of the lever arms lifts the guard rails and the bridges from the frame into the maintenance position of the conveyer assembly.

3. The conveyer assembly of claim 1, further comprising bridges connecting the guard rails together transversally above the belt and supporting at least one separator running longitudinally between the opposite guard rails, wherein the deployment of the lever arms lifts the guard rails, the bridges and the at least one separator from the frame into the maintenance position of the conveyer assembly.

4. The conveyer assembly of claim 1, wherein said frame comprises longitudinal slider supports supporting the upper run of the belt in the operating position of the assembly.

5. The conveyer assembly of claim 1, comprising at least one pair of tensioning arms, the tensioning arms of a pair being connected together as a unit across the width of the frame under a return run of the belt, wherein, said tensioning arms contacting an undersurface of the return run of the belt and lifting the return run of the belt against the frame in said operating position of the assembly.

6. The conveyer assembly of claim 1, comprising at least one pair of tensioning arms connected together as a unit across the width of the frame under a return run of the belt, each arm of a pair being configured to pivot on opposite directions, wherein when pivoted up, said tensioning arms contact an undersurface of the return run of the belt and push the return run of the belt against the frame in said operating position of the assembly.

7. The conveyer assembly of claim 1, comprising a belt tensioner, said belt tensioner lifting a return run of the belt against the frame in said operating position of the assembly; and releasing said return run of the belt in said maintenance position of the assembly.

8. The conveyer assembly of claim 1, wherein upon the deployment of the lever arms, said fingers are moved into contact with the upper run of the belt, thereby pushing the upper run of the belt up away from the frame; and as the lever arms are released, said fingers pivot back and release the upper run of the belt down to the frame.

9. The conveyer assembly of claim 1, wherein said at least one pair of lever arms comprises opposite lever arms connected together as a unit across a width of the frame by a shaft, said shaft supporting said fingers; and, upon pivoting of the shaft during extension of the lifting members from the operating position to the maintenance position, the fingers being moved into contact with an undersurface of the upper run of the belt as the lever arms deploy, the fingers thus being raised into contact with the underside of the upper run of the belt and pushing the upper run of the belt up, from below, as the guard rails are lifted up to the maintenance position.

10. The conveyer assembly of claim 1, in the maintenance position, the belt is lifted above the frame by the fingers, and the guard rails are lifted above the frame by the deployed lever arms.

11. A method for maintenance of a conveyer assembly comprising a conveyer belt supported in rotation by a frame in an operating position; guard rails connected to the frame by lifting members on each side of the frame, and running longitudinally along an upper run of the belt on each side of the frame in the operating position of the conveyer assembly; and lever arms connected on each side of the frame and connected to pivoting fingers below an upper run of the belt, the method comprising deploying the lever arms, thereby pivoting the fingers up to the upper run of the belt such that the fingers come into contact with an undersurface of the upper run of the belt and lift the upper run of the belt up from the frame into a maintenance position of the conveyer assembly.

12. The method of claim 11, the conveyer assembly further comprising bridges connecting the guard rails together transversally above the frame and further supporting at least one separator running longitudinally between the opposite guard rails, wherein said deploying the lever arms simultaneously lifts the guard rails, the bridges, and the at least one separator from the frame.

13. The method of claim 11, wherein the assembly comprises at least one pair of tensioning arms connected together as a unit across the width of the frame under a return run of the belt, the tensioning arms contacting an undersurface of the return run of the belt and supporting the return run of the belt in the operating position of the assembly, said method comprising rotating the tensioning arms down thereby releasing the return run of the belt in the maintenance position of the assembly.

14. The method of claim 11, comprising providing tensioning arms supporting a return run of the belt in the operating position of the assembly, said method comprising releasing the tensioning arms thereby releasing the return run of the belt in the maintenance position of the assembly.

15. The method of claim 11, comprising providing a belt tensioner, and operating the belt tensioner to lift a return run of the belt against the frame in the operating position of the assembly; and to release the return run of the belt in the maintenance position of the assembly.

16. The method of claim 11, wherein upon said deploying of the lever arms, the fingers are moved into contact with the upper run of the belt, thereby lifting and supporting the upper run of the belt up away from the frame; the method further comprising releasing the lever arms, thereby pivoting the fingers back and releasing the belt into the operating position.

17. A combination comprising a conveyer belt supported in rotation by a frame, and guard rails connected to the frame by lifting members on each side of the frame, and running longitudinally along an upper run of the belt on each side of the frame in an operating position of the conveyer assembly, lever arms connected to pivoting fingers connecting said guard rail to said frame;

wherein:
upon deployment of the lever arms, said fingers pivot into contact with the upper run of the belt, thereby pushing the upper run of the belt up away from the frame, while the guard rails are lifted up from the frame; and
upon release of the lever arms, said fingers pivot back between the upper run of the belt and the frame, thereby releasing the upper run of the belt while the guard rails are lowered to the frame.

18. The combination of claim 17, further comprising a belt tensioner configured to lift a return run of the belt against the frame; and to release the return run of the belt.

19. The combination of claim 17, further comprising bridges connecting the guard rails together transversally above the frame; wherein:
upon deployment of the lever arms, said bridges are lifted up from the frame with the guard rails; and
upon release of the lever arms, said bridges are lowered down with the guard rails.

20. The combination of claim 17, further comprising at least one separator running longitudinally between the opposite guard rails; wherein:
upon deployment of the lever arms, said at least one separator is lifted up from the frame with the guard rails; and
upon release of the lever arm, said at least one separator is lowered with the guard rails.

* * * * *